(12) United States Patent
Poeltenstein et al.

(10) Patent No.: US 8,763,578 B2
(45) Date of Patent: Jul. 1, 2014

(54) VEHICLE DRIVE HAVING AT LEAST TWO STARTING SYSTEMS

(71) Applicant: Bayerische Motoren Werke Aktiengesellschaft, Munich (DE)

(72) Inventors: Axel Poeltenstein, Eching (DE); Johann Knoeferl, Schrobenhausen (DE); Thomas Hardtke, Munich (DE); Peter Straehle, Brunnthal/Faistenhaar (DE)

(73) Assignee: Bayersiche Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/773,085

(22) Filed: Feb. 21, 2013

(65) Prior Publication Data

US 2013/0160731 A1 Jun. 27, 2013

Related U.S. Application Data

(63) Continuation of application No. PCT/EP2011/004191, filed on Aug. 19, 2011.

(30) Foreign Application Priority Data

Sep. 29, 2010 (DE) .......... 10 2010 041 631

(51) Int. Cl.
*F02N 11/08* (2006.01)
*F02N 11/00* (2006.01)

(52) U.S. Cl.
CPC .............. *F02N 11/006* (2013.01); *F02N 11/08* (2013.01); *F02N 11/087* (2013.01)
USPC .................................. 123/179.28; 123/179.3

(58) Field of Classification Search
CPC ...... F02N 11/006; F02N 11/08; F02N 11/087
USPC ................. 123/179.1, 179.25, 179.28, 179.3, 123/179.14, 179.15; 701/107, 113; 290/30 R, 31, 32, 34, 38 R, 36 R, 40 R, 290/40 C
See application file for complete search history.

(56) References Cited

U.S. PATENT DOCUMENTS

| 5,934,395 | A | 8/1999 | Koide et al. | |
|---|---|---|---|---|
| 6,018,199 | A * | 1/2000 | Shiroyama et al. | 290/37 A |
| 6,335,574 | B1 * | 1/2002 | Ochiai et al. | 290/40 C |
| 6,396,165 | B1 * | 5/2002 | Nagano et al. | 307/10.6 |

(Continued)

FOREIGN PATENT DOCUMENTS

| DE | 197 05 610 A1 | 12/1997 |
|---|---|---|
| DE | 102 49 621 A1 | 4/2004 |
| DE | 10 2005 036 284 A1 | 3/2006 |
| DE | 10 2007 037 758 A1 | 3/2009 |

(Continued)

OTHER PUBLICATIONS

German Search Report dated Aug. 4, 2011 including partial English-language translation (Six (6) pages).

(Continued)

*Primary Examiner* — Hai Huynh
(74) *Attorney, Agent, or Firm* — Crowell & Moring LLP

(57) ABSTRACT

A vehicle drive, having an internal-combustion engine, includes a first a second starting system for starting the internal-combustion engine, where neither the first nor the second starting system is provided for generating vehicle propulsion.

20 Claims, 1 Drawing Sheet

(56) References Cited

U.S. PATENT DOCUMENTS

| | | | |
|---|---|---|---|
| 6,555,927 B1* | 4/2003 | Suzuki et al. | 290/34 |
| 6,694,938 B2* | 2/2004 | Vilou | 123/179.3 |
| 6,992,403 B1* | 1/2006 | Raad | 307/47 |
| 7,547,264 B2* | 6/2009 | Usoro | 475/5 |
| 8,089,170 B2* | 1/2012 | Patterson | 290/40 R |
| 2008/0264374 A1* | 10/2008 | Harris | 123/179.3 |
| 2012/0256524 A1* | 10/2012 | Fulton | 310/68 E |
| 2013/0110329 A1* | 5/2013 | Kinoshita et al. | 701/21 |

FOREIGN PATENT DOCUMENTS

| | | | |
|---|---|---|---|
| EP | 0 769 403 B1 | 4/1997 | |
| EP | 1 441 123 B1 | 7/2004 | |
| EP | 2 221 226 B1 | 8/2010 | |
| GB | 2486708 | * 6/2012 | B60W 20/00 |

OTHER PUBLICATIONS

International Search Report dated Nov. 4, 2011. (Five (5) pages).

* cited by examiner

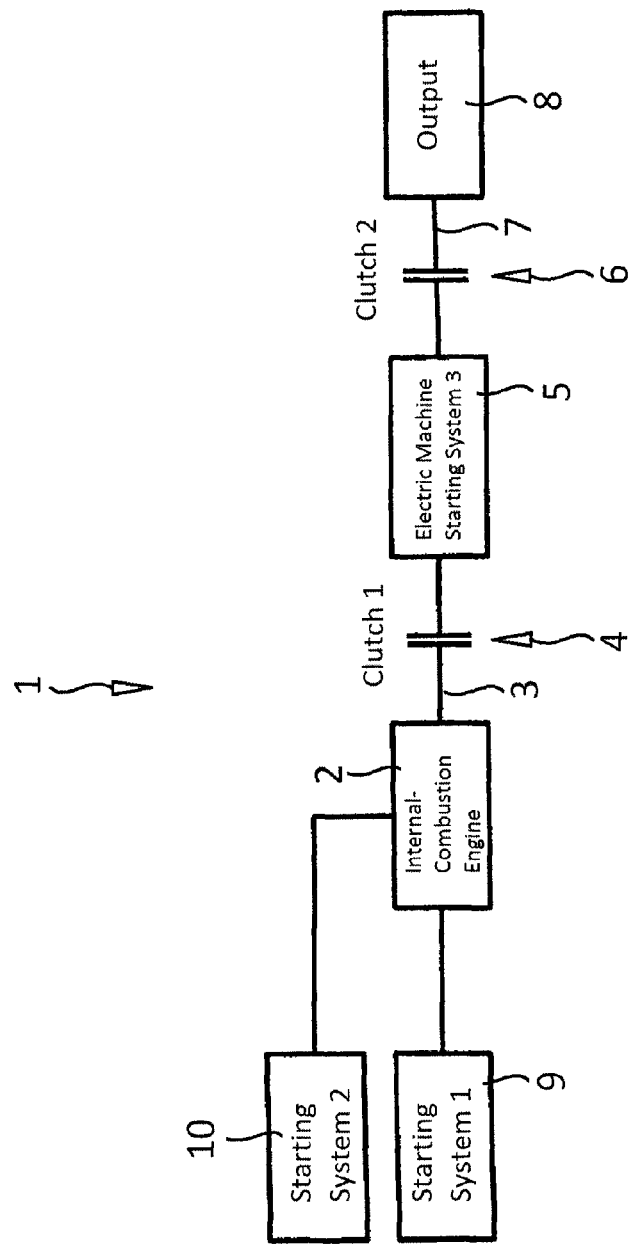

VEHICLE DRIVE HAVING AT LEAST TWO STARTING SYSTEMS

CROSS REFERENCE TO RELATED APPLICATIONS

This application is a continuation of PCT International Application No. PCT/EP2011/004191, filed Aug. 19, 2011, which claims priority under 35 U.S.C. §119 from German Patent Application No. 10 2010 041 631.2, filed Sep. 29, 2010, the entire disclosures of which are herein expressly incorporated by reference.

BACKGROUND AND SUMMARY OF THE INVENTION

The present invention relates to a vehicle drive as recited in the independent claims.

A vehicle having a parallel hybrid drive is known from German Patent Document DE 10 2007 037 758 A1. A crankshaft of the internal-combustion engine is connected with the rotor of an electric machine by way of a torsional vibration damper and a clutch. The rotor of the electric machine is, in turn, coupled with an input shaft of a transmission. Although the internal-combustion engine could be started by the electric machine, a separate starter device is provided for starting the internal-combustion engine. The starter device may be a starter which is coupled with the crankshaft of the internal-combustion engine by means of a belt drive, or which may be a pinion starter. A starting of the internal-combustion engine by way of the electric machine is specifically not provided in German Patent Document 10 2007 037 758 A1 because, as indicated in German Patent Document DE 10 2007 037 758 A1, this would require very high control-related expenditures.

German Patent Document DE 10 2007 061 895 A1 also describes a hybrid drive, in the case of which, for starting the internal-combustion engine, a separate "electric motor" is provided which is coupled with the crankshaft of the internal-combustion engine by way of a belt drive. German Patent Document DE 10 2008 027 658 A1 as well as Japanese Patent Document JP 2001336466 A describe a further hybrid drive of this type.

Modern vehicles are increasingly equipped with a so-called "engine start-stop system." This is a complicated electronic control, which "automatically" switches off the internal-combustion engine under certain conditions as a function of a plurality of parameters and "automatically" restarts the internal-combustion engine in the presence of certain other conditions. An engine start-stop system will switch off the internal-combustion engine, for example, in stop-and-go traffic, when the vehicle is stopped temporarily. As soon as the driver gives a "start signal," for example by stepping on the clutch in the case of a vehicle equipped with a manual transmission, the automatic engine start-stop system will restart the internal-combustion engine. In the case of vehicles that are equipped with an automatic engine start-stop system, the internal-combustion engine is therefore switched off and restarted significantly more frequently than in the case of conventional vehicles. During the start of an internal-combustion engine at the operating temperature, in the engine start-stop operation, a starting system has to meet very different requirements than, for example, during a cold start of the internal-combustion engine at a very low temperature level (winter).

It is an object of the invention to create a vehicle drive that has a starting device for starting the internal-combustion engine, which starting device is optimally adapted to the requirements existing under different conditions.

This object is achieved by the characteristics of the independent claims. Advantageous embodiments and further developments of the invention are contained in the subclaims.

The starting point of the invention is a vehicle drive having an internal-combustion engine and a first starting system (first starting device) provided for starting the internal-combustion engine.

According to the invention, for starting the internal-combustion engine, in addition to a first starting system, a second starting system (second starting device) may be provided which can be controlled independently of the latter and operates independently of the latter, neither the first nor the second starting system being provided for generating vehicle propulsion. Vehicle propulsion may be generated (a) exclusively by the internal-combustion engine if the vehicle is a conventional vehicle (non-hybrid vehicle), or (b) by the internal-combustion engine and/or by an electric driving machine if the vehicle is a hybrid vehicle.

However, it may be provided that one of the starting systems or both starting systems is/are used under certain conditions for recuperating mechanical energy and generating electric energy, which can then be stored in a battery system.

The two starting systems may be designed for different starting conditions. For example, one starting system may be designed for cold or low-temperature starts of the internal-combustion engine. If the vehicle is equipped with an engine start-stop system, the second starting system can be used for starting the internal-combustion engine (which is at the operating temperature), after a brief engine stop controlled by the engine start-stop system.

Up to a certain degree, the two starting systems may also have a redundant design. This means that, in the event of a failure of one of the two starting systems, the other starting system can take over the concerned function at least until a repair shop has been reached.

The invention is suitable for conventional vehicles that are equipped exclusively with an internal-combustion engine as the driving engine. As an alternative, the invention can also be used in the case of hybrid vehicles, particularly in the case of vehicles having a parallel hybrid drive, where, in addition to the internal-combustion engine, an electric machine is provided which generates propulsion, whereby the vehicle can optionally be driven only by the internal-combustion engine, only by the electric motor and/or in a combined manner, i.e., by the internal-combustion engine and the electric motor.

One of the two starting systems may, for example, be a pinion starter. Pinion starters are suitable particularly for cold starts of the internal-combustion engine. The other starting system may, for example, be a starter generator which is coupled by means of a belt drive with the crankshaft of the internal-combustion engine and is suitable primarily for starting the internal-combustion engine in the engine start-stop operation, i.e. for a starting after an only temporary switching-off of the internal-combustion engine by an engine start-stop system. If the vehicle is a full hybrid vehicle, which can also be driven purely electrically, the second starting system (for example, the starter generator in the belt drive) can also be used for the additional starting of the internal-combustion engine during purely electric driving.

In the case of a hybrid vehicle (e.g., a vehicle where, in addition to the internal-combustion engine, an electric machine that generates a vehicle propulsion), the electric machine can in principle also be used as a "third starting system" for starting the internal-combustion engine (for example, when the two starting systems have failed).

Which of the two or three starting systems provided in the vehicle is specifically optimal in a certain driving or vehicle state for starting the internal-combustion engine is determined by means of a starting system selection strategy (additional-start manager) implemented in an electronic system of the vehicle. This "additional-start manager" selects the momentarily best suitable starting system and coordinates the individual starting systems.

If a defect is detected in one of the existing starting systems, it may be provided that the automatic engine start-stop system or the additional-start manager will no longer take into account the defective starting system in the further operation and, for starting the internal-combustion engine, will use the remaining starting system or the two remaining starting systems, whereby it is ensured that the driver can continue to drive in an "emergency operating mode".

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically illustrates the basic principle of one embodiment of the invention by means of a parallel hybrid drive.

DETAILED DESCRIPTION OF THE DRAWINGS

FIG. 1 illustrates a parallel hybrid drive 1 with an internal-combustion engine 2 whose crankshaft 3 can be coupled by way of a first clutch 4 with an electric machine 5. The electric machine 5 can be used as an electric motor for generating vehicle drive or as a generator for recuperating mechanical energy and for the conversion to electric energy. A rotor (not shown) of the electric machine 5 can be coupled by way of a second clutch 6 with an input 7 of a transmission 8 which may, for example, be an automatic transmission.

For starting the internal-combustion engine, a first starting system 9, which may, for example, be a pinion starter, is provided, and a second starting system 10 is provided, which can be coupled, for example, by way of a belt drive with the crankshaft 3 of the internal-combustion engine 2. It may be provided that cold starts of the internal-combustion engine 2 are carried out by the first starting system 9, and that a starting of the internal-combustion at operating temperature takes place by means of the second starting system 10. The electric machine 5, which is primarily provided for generating vehicle propulsion and for recuperating mechanical energy, can be used for starting the internal-combustion engine 2 when one of the two starting systems 9, 10 or both starting systems 9, 10 have failed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle drive comprising an internal-combustion engine and a first starting system configured to start the internal-combustion engine, and wherein, for starting the internal-combustion engine, a second starting system is provided, wherein neither the first nor the second starting system is configured to generate vehicle propulsion and wherein only one of the first or second starting system is used to start the internal-combustion engine at any given time, wherein the vehicle drive further comprises an electronic control system which, in a situation in which the internal-combustion engine is to be started and where neither the first nor second starting system is defective, determines at least in part on engine temperature by which of the first and second starting systems the internal-combustion engine is to be started, and starts the internal-combustion engine by means of the corresponding starting system.

2. The vehicle drive according to claim 1, wherein, in addition to the first starting system and the second starting system, the vehicle drive further comprises an electric machine that is configured to generate vehicle propulsion.

3. The vehicle drive according to claim 2, wherein one of the first and second starting systems comprises a pinion starter that is used for starting the internal-combustion engine at low engine temperatures.

4. The vehicle drive according to claim 3, wherein one of the first and second starting systems comprises an electric motor or an electric motor/generator that is coupled by way of a belt drive with a crankshaft of the internal-combustion engine.

5. The vehicle drive according to claim 4, wherein the electric motor or electric motor/generator is configured to start the internal-combustion engine when the internal-combustion engine is at an operating temperature and has been temporarily switched off by an electronic engine start-stop system on the basis of predefined vehicle condition parameters.

6. The vehicle drive according to claim 2, wherein one of the first and second starting systems comprises an electric motor or an electric motor/generator that is coupled by way of a belt drive with a crankshaft of the internal-combustion engine.

7. The vehicle drive according to claim 1, wherein one of the first and second starting systems comprises a pinion starter that is used for starting the internal-combustion engine at low engine temperatures.

8. The vehicle drive according to claim 7, wherein the electric motor or electric motor/generator is further configured to start the internal-combustion engine under operating conditions in which the vehicle is driven by an electric machine that is configured to generate vehicle propulsion.

9. The vehicle drive according to claim 1, wherein one of the first and second starting systems comprises an electric motor or an electric motor/generator that is coupled by way of a belt drive with a crankshaft of the internal-combustion engine.

10. The vehicle drive according to claim 9, wherein the electric motor or electric motor/generator is configured to start the internal-combustion engine when the internal-combustion engine is at an operating temperature and has been temporarily switched off by an electronic engine start-stop system on the basis of predefined vehicle condition parameters.

11. The vehicle drive according to claim 9, wherein the electric motor or electric motor/generator is further configured to start the internal-combustion engine under operating conditions in which the vehicle is driven by an electric machine that is configured to generate vehicle propulsion.

12. The vehicle drive according to claim 11, wherein a crankshaft of the internal-combustion engine is coupled, by way of a first clutch, with the electric machine that is configured to generate vehicle propulsion, wherein the electric machine is coupled, by way of a second clutch, with an input of a transmission.

13. The vehicle drive according to claim 1, wherein the electric motor or electric motor/generator is further configured to start the internal-combustion engine under operating conditions in which the vehicle is driven by an electric machine that is configured to generate vehicle propulsion.

14. The vehicle drive according to claim 13, wherein a crankshaft of the internal-combustion engine is coupled, by way of a first clutch, with the electric machine that is configured to generate vehicle propulsion, wherein the electric machine is coupled, by way of a second clutch, with an input of a transmission.

15. The vehicle drive according to claim 14, wherein the electric machine that is configured to generate vehicle propulsion is arranged between the internal-combustion engine and a transmission.

16. A vehicle drive system comprising:
an internal-combustion engine;
a first starting system coupled to and configured to start the internal-combustion engine;
a second starting system coupled to and configured to start the internal-combustion engine, wherein neither the first nor the second starting system is configured to generate vehicle propulsion and wherein only one of the first or second starting system is used to start the internal-combustion engine at any given time; and
an electronic control system electrically coupled to the first and second starting systems, wherein the electronic control system is configured to determine, based at least in part on engine temperature when neither the first nor second starting system is defective, which of the first and second starting system is to be used to start the internal-combustion engine.

17. The vehicle drive system according to claim 16, wherein, in addition to the first starting system and the second starting system, the vehicle drive system further comprises an electric machine that is configured to generate vehicle propulsion.

18. The vehicle drive system according to claim 16, wherein one of the first and second starting systems comprises a pinion starter that is used for starting the internal-combustion engine at low engine temperatures.

19. The vehicle drive system according to claim 16, wherein one of the first and second starting systems comprises an electric motor or an electric motor/generator that is coupled by way of a belt drive with a crankshaft of the internal-combustion engine.

20. The vehicle drive system according to claim 19, wherein the electric motor or electric motor/generator is configured to start the internal-combustion engine when the internal-combustion engine is at an operating temperature and has been temporarily switched off by an electronic engine start-stop system on the basis of predefined vehicle condition parameters.

* * * * *